United States Patent [19]

Ritter

[11] Patent Number: 4,871,000
[45] Date of Patent: Oct. 3, 1989

[54] METHOD AND APPARATUS FOR THE CONTINUOUS MEASUREMENT OF THE DEPTH OF A RADIOACTIVE GLASS MELT FLOWING INTO A CONTAINER

[75] Inventor: Harald Ritter, Isernhagen, Fed. Rep. of Germany

[73] Assignee: Deutsche Gesellschaft fur Wiederaufarbeitung von Kernbrennstoffen mbH, Hanover, Fed. Rep. of Germany

[21] Appl. No.: 201,286

[22] Filed: May 26, 1988

Related U.S. Application Data

[63] Continuation of Ser. No. 886,653, Jul. 18, 1986, abandoned.

[30] Foreign Application Priority Data

Jul. 31, 1985 [DE] Fed. Rep. of Germany ....... 3527349

[51] Int. Cl.⁴ .................... B67C 3/20; G01F 23/24
[52] U.S. Cl. .................................. 141/95; 65/158; 73/304 R; 338/80
[58] Field of Search ............. 73/304 R, 290/R; 364/510; 141/83, 95; 65/160, 164; 338/38, 27, 80

[56] References Cited

U.S. PATENT DOCUMENTS

| | | | |
|---|---|---|---|
| 1,019,616 | 3/1912 | Eilertsen | 338/38 X |
| 2,121,141 | 6/1938 | De Lange | 338/27 X |
| 3,665,080 | 5/1972 | Medovar et al. | 164/4.1 X |
| 3,919,975 | 11/1975 | Duncan | 222/64 X |
| 4,188,826 | 2/1987 | Kankura et al. | |
| 4,377,550 | 3/1983 | Tokarz | 324/65 R |
| 4,521,373 | 6/1985 | Terhune et al. | 376/258 |
| 4,597,048 | 6/1986 | Mazur et al. | 364/510 X |
| 4,635,832 | 1/1987 | Angerer et al. | 164/155 |

FOREIGN PATENT DOCUMENTS

2723999 5/1977 Fed. Rep. of Germany .
2925092 6/1979 Fed. Rep. of Germany .

OTHER PUBLICATIONS

English Translation of German Patent No. 29 25 092.

Primary Examiner—Daniel M. Yasich
Attorney, Agent, or Firm—Allegretti & Witcoff, Ltd.

[57] ABSTRACT

A method of continuous measurement of the depth of fill of a radioactive glass melt flowing from a melting furnace or from a storage container into a chill mold (special steel receiver) consists in measuring the electrical resistance of the flowing jet stream. From the measured electrical resistance, which is proportional to the length of the jet of molten glass, the length of the stream of molten glass is determined. The length is a measure of the depth of fill. It decreases with increasing depth of fill. In an apparatus for the performance of the method the jet of molten glass is part of an electrical circuit which includes a current measuring instrument connected to an evaluator unit. The method and the apparatus enable the measurement of the depth of fill with the lowest outlay and the possibility of performing redundant diversionary measurements, whereby a high degree of availability may be achieved. Work of operation by hand on the chill mold is not impeded.

4 Claims, 3 Drawing Sheets

METHOD AND APPARATUS FOR THE CONTINUOUS MEASUREMENT OF THE DEPTH OF A RADIOACTIVE GLASS MELT FLOWING INTO A CONTAINER

This application is a continuation of application Ser. No. 886,653, filed July 18, 1986, now abandoned.

The invention concerns a method for measuring continuously the depth of fill of radioactive glass melt flowing from a melting furnace or a storage container into a chill mold. Also to apparatus for performing the method.

PRIOR ART

German Patent Specification No. 17 23 999 concerns a device for the electrical measurement of the depth of electrically conductive liquids. An immersion electrode as the sensor for the depth of the liquid is connected to an a.c. voltage source. By the surface of the portion of it immersed in the liquid the electrode is connected electrically conductively to the liquid. The ends of the electrode are connected to the a.c. voltage source, each by a lead insulated electrically from the liquid and from the container for the liquid. The input resistance of the electrode must be negligibly small as compared with the contact resistance between the electrode and the liquid. An electrical level meter measures the voltage difference between a point in the liquid outside the stray field of the electrode in comparison with a reference voltage in the a.c. circuit. Such immersion electrodes must be mounted rigidly and are problematic at high temperatures. As regards insulation and cable connections they demand a high mechanical outlay. Furthermore such immersion electrodes represent an obstacle to the work of operation by hand.

German Patent Specification No. 29 25 092 shows an arrangement for detection of the level of an electrically conductive liquid. The liquid is in contact with two electrodes separated spatially from one another, which lie in an electrical parallel resonant circuit to which is connected an evaluator unit. The parallel resonant circuit is level-independent in resonance. The ohmic resistance between the electrodes in the electrically conductive liquid is utilized as damping of the resonant oscillations, where the damping is used as a measure of the level of the electrically conductive liquid. This known arrangement exhibits essentially the same disadvantages as the device according to the German Specification No. 27 23 999.

SUMMARY OF THE INVENTION

The object of the present invention is to specify a method and a device of the kind mentioned initially, whereby at small expense reliable measurements of depth of fill may be performed without impeding work of operation by hand upon the chill mold.

This object is achieved by measuring the electrical resistance of the jet stream of glass melt by placing electrodes at the point where the stream leaves the melting furnace and at the bottom of the chill mold which is being filled. The resistance is proportional to the length of the stream of molten glass which in turn is a measure of the depth of fill. As the depth of glass in the mold increases, the electrical resistance increases.

In the measuring apparatus, the jet stream comprises part of an electrical circuit which includes a measuring instrument such as an ohmmeter or ammeter which feeds a signal to an evaluator which determines the depth of fill and printer or other recording means.

The method of measurement in accordance with the invention is favorable in cost and may be realized with very low outlay. For the measuring apparatus, most of the parts already exist. It may be produced from cheap robust wear-resistant components which are insensitive to radiation. In practice only two cable connections need to be provided. Work of operation by hand on the chill mold is no longer influenced. Even the formation of foam on the surface of the glass melt in the chill mold may be detected. Through the method in accordance with the invention a monitoring of the bottom outlet or the overflow of the glass melting furnace is at the same time realized. The continuous measurement of the depth of fill enables easy monitoring of limiting value in chill molds which are to be filled with molten glass.

The invention may be used as a "diversitary" redundant measurement for an ordinary measurement of weight.

THE DRAWINGS

The invention will be explained in greater detail below with the aid of the attached drawing in which embodiments are illustrated. There is shown in:

FIG. 1—a diagrammatic vertical section through a first apparatus for the continuous measurement of the depth of fill of a radioactive glass melt;

FIG. 2—a similar diagrammatic view of a second arrangement for the continuous measurement of the depth of fill of a radioactive glass melt; and FIG. 3—a diagrammatic view of a device for the evaluation of the measuring signals gathered by the apparatus of FIGS. 1 and 2.

DETAILED DESCRIPTION

Figure 1:
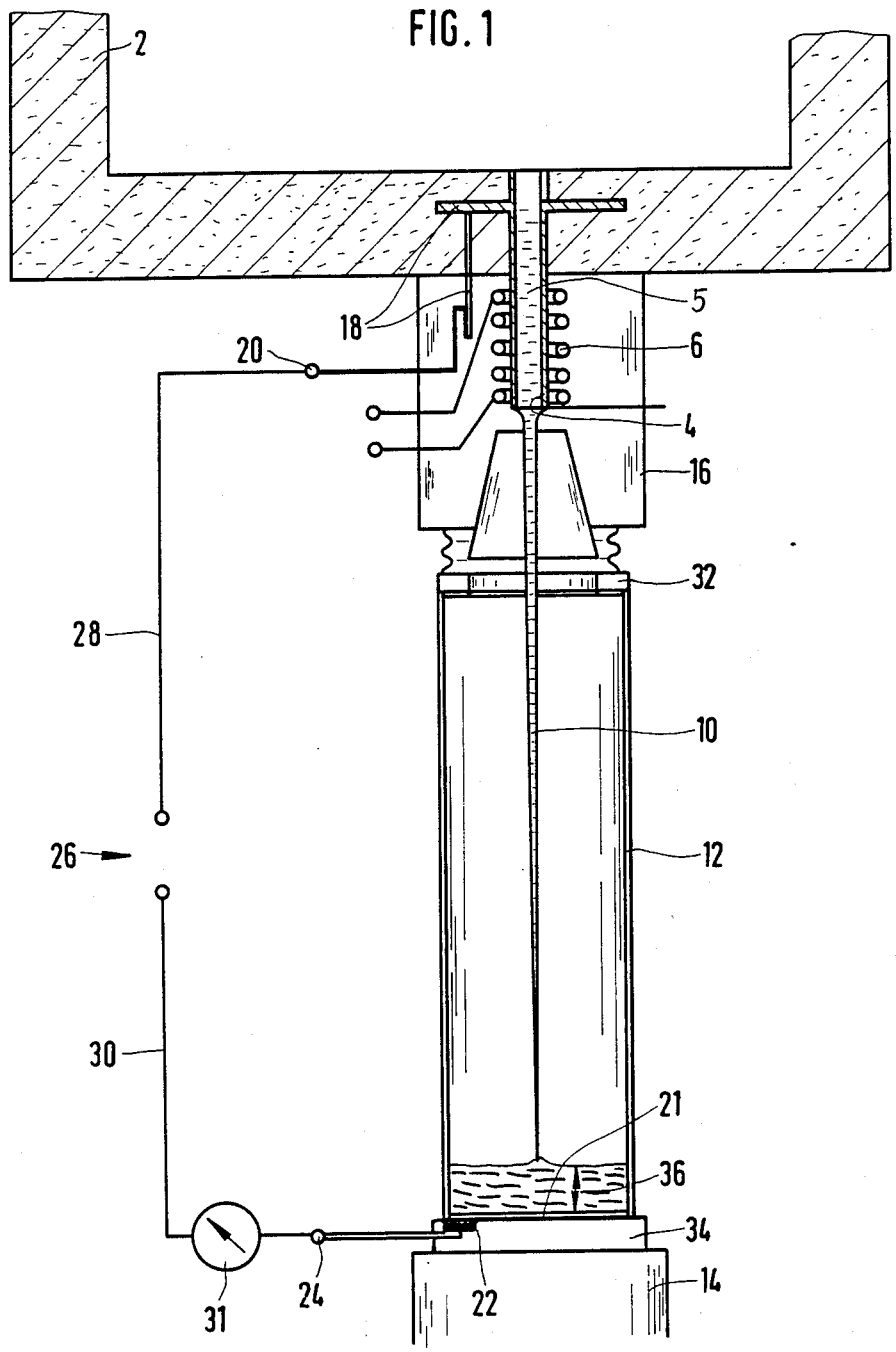

The drawing shows diagrammatically in FIG. 1 the bottom of a melting furnace or storage container 2 for radioactive glass melts having a bottom outlet 4, here in the form of a spout for the radioactive glass melt 5. Around the bottom outlet a heater 6 may be provided as is illustrated in the drawing.

Figure 2:
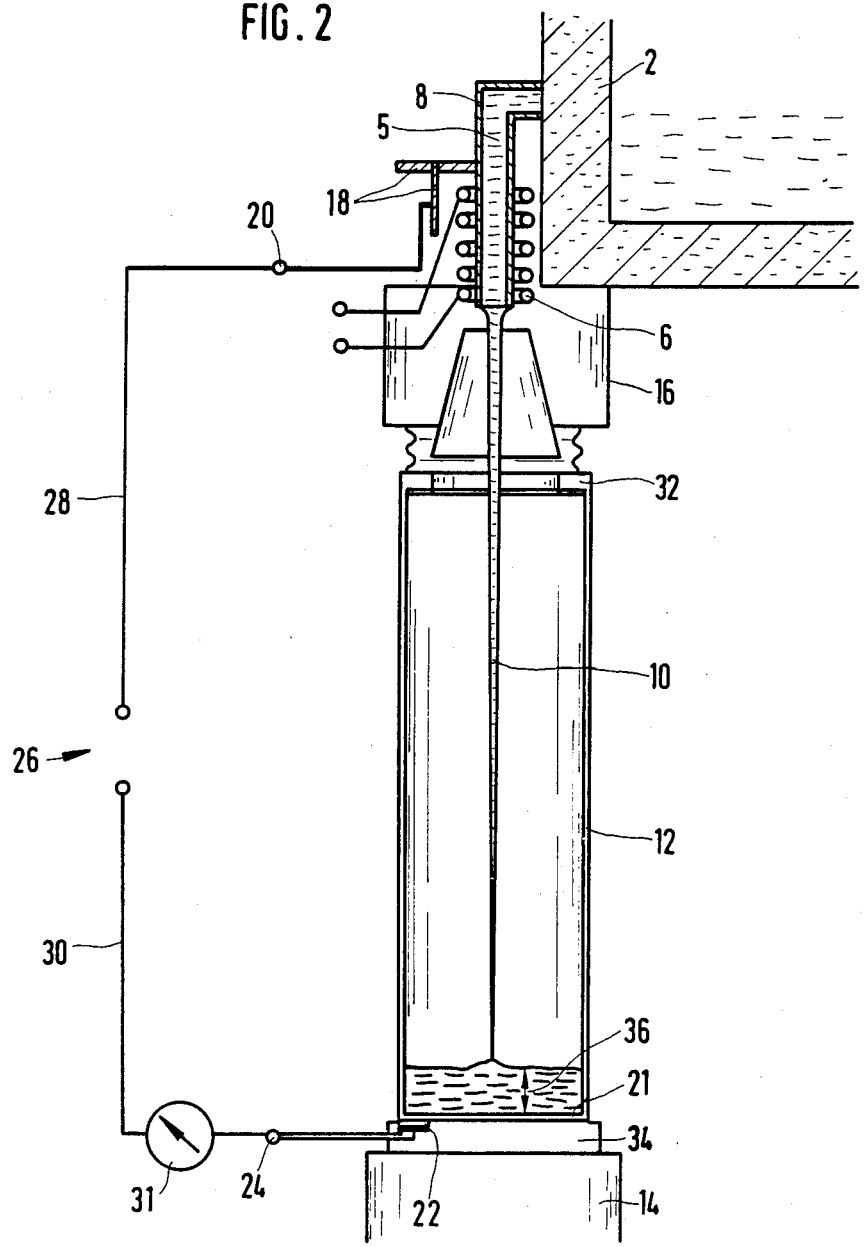

In FIG. 2 the melting furnace 2 has an overflow 8 for the glass melt 5.

From the bottom outlet 4 or the overflow 8 the glass melt 5 flows in the form of a jet stream 10 of molten glass into a chill mold (cylindrical special steel receiver) 12 arranged underneath the melting furnace 2. The chill mold stands on a base 14. Interposed between the chill mold 12 and the melting furnace 2 are transition pieces 16 for the purpose of screening.

At the bottom outlet 4 or at the overflow 8 there is provided a first electrode 18 having a connection 20 and under the bottom 21 of the chill mold 12 as a second electrode 22 with a connection 24, a contact plate 22 connected electrically to the chill mold. A voltage source 26 is connected via leads 28 and 30 to the electrodes 18 and 22 or respectively to their connections 20 and 24. In the lead 30 is connected a circuit resistance measuring instrument 31.

The chill mold 12 is electrically insulated by insulation 32 with respect to the melting furnace 2 and by insulation 34 with respect to earth potential.

As soon as a jet 10 of molten glass emerges from the bottom outlet 4 or the overflow 8 and touches the chill mold 12, the circuit is closed and the current or alternatively the electrical resistance may be read on the measuring instrument 31.

At the start of the filling of the chill mold 12, the electrical resistance is highest. The electrical resistance decreases with increasing depth of fill 36 in the chill mold 12. The electrical resistance is lowest at maximum fill of the chill mold 12. The current measured at the start of filling of the chill mold 12 is correspondingly lowest; the current measured at maximum fill is correspondingly highest.

The equation which holds is $$R_G = F^L \times P \text{ or, } L = (R_G \times F)/P.$$

in which $R_G$ is the electrical resistance at the jet 10 of molten glass, L is the length of the jet of molten glass, F is the cross-sectional area of the jet of molten glass and P is the density of the molten glass. Since L changes with the changing of the depth of fill, with knowledge of the initial length $L_{max}$ or of the initial resistance $R_{Gmax}$ the depth of fill may be determined directly from the alteration of the resistance, if P and F are kept constant. That is, the depth of fill then results simply as the difference between the initial length of the jet of molten glass and the actual length of the jet of molten glass.

In the case of non-constant density P it is to be observed that the density depends essentially upon the composition of the molten glass and the temperature of the molten glass. The cross-section F is likewise dependent upon the temperature. The temperature of the molten glass in the jet may be set through the heater 6 at the bottom outlet or at the overflow. Thus, the power of the heater 6 may be taken as a measure of the temperature. Further quantities which are necessary for the determination of the electrical resistance and thereby finally for the determination of the depth of fill, are the voltage of the voltage source 26 and the strength of the current which is measured by the measuring instrument 31. All of these quantities are fed to an evaluator unit 40 which determines the depth of fill utilizing the foregoing equation. With inputs as stated, the evaluator unit 40 calculates the actual length of the jet of molten glass, L. As stated above, the depth of fill is the difference between the initial length of the jet of molten glass, $L_{Gmax}$, and the actual length of molten glass, L, or ($L_{Gmax} - L$). Thus, with input of the initial length $L_{Gmax}$, and as the actual resistance $R_G$ in input, the evaluator unit 40 calculates the depth of fill as equal to ($L_{Gmax} - L$), or ($L_{Gmax} - (R_G \times F)/P$).

If the resistance $R_{Gmax}$, not the initial length $L_{Gmax}$, is input, then the evaluator unit 40 calculates the initial length of molten glass, $L_{Gmax}$, by calculation according to the equation. As the actual resistance is input, the evaluator again calculates the depth of fill as equal to ($L_{Gmax} - L$).

Figure 3:
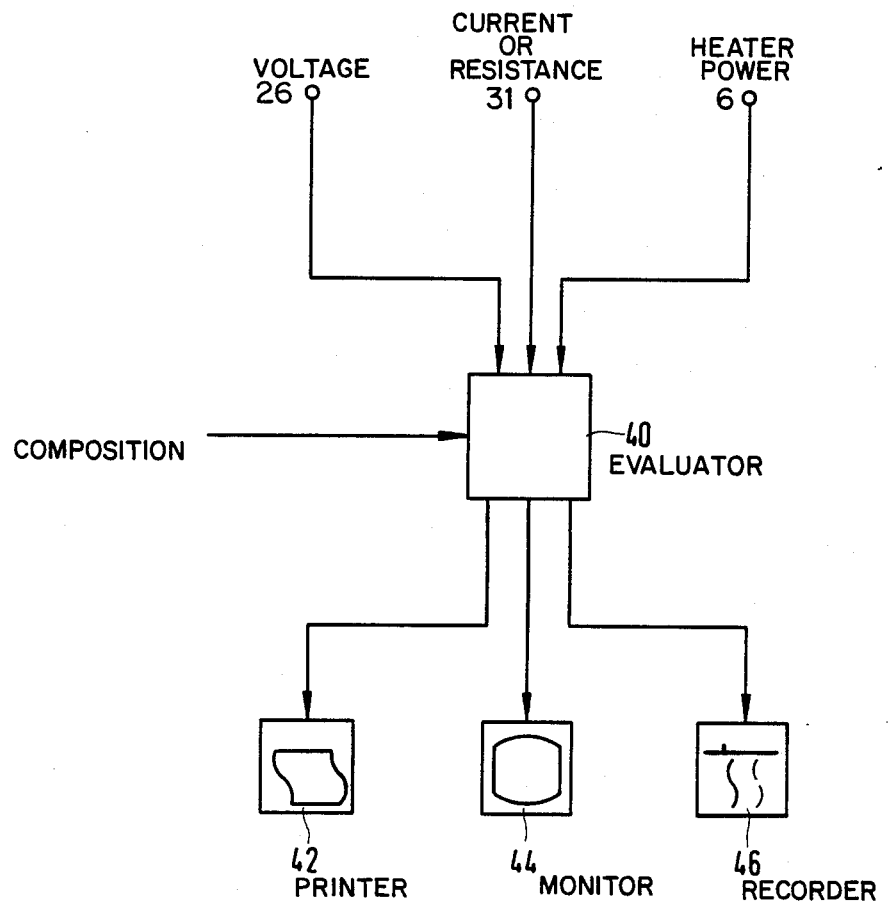

If instead of resistance, the measuring instrument 31 reads current, then the current and the voltage of source 26 are input to the evaluator unit 40, as shown in FIG. 3, and the evaluator unit 40 arrives at resistance according to the basic electrical equation: Resistance = Voltage/Current.

All the input quantities and the depth of fill are fed to a printer 42, a monitor 44 or a tape recorder 46 for indication and documentation, cf. FIG. 3.

What is claimed is:

1. A method for measuring the depth of fill of an electrically conductive liquid flowing in a stream from a point of discharge of a first container into a second container, the depth of fill being the depth of the liquid in the second container, the method comprising:
causing electricity to flow in the stream from the first container to the second container; measuring an electrical characteristic of the electricity flowing in the stream; calculating the depth of fill utilizing the electrical characteristic; in which the calculation of the depth of fill includes the steps of: calculating the length of the stream from the point of discharge to the fill,
utilizing the electrical characteristic; and calculating the depth of fill utilizing the calculated length of the stream; in which the step of causing electricity to flow in the stream includes causing an
electrical current to flow in the stream, and the step of measuring an electrical
characteristic of the electricity includes measuring the electrical current in the stream; in which the step of measuring an electrical characteristic of the electricity
includes measuring the electrical resistance of the electrical current in the stream; and in which the step of calculating the length of the stream includes calculation of the length of the stream according to the relationship: $L = (R \times F)/P$, where L equals the length of the stream, R equals the measured electrical resistance, F equals a cross-sectional area of the stream, and P equals the density of the liquid in the stream.

2. A method of continually measuring the depth of fill of radioactive, molten glass in a chill mold, the radioactive molten glass flowing in a jet stream from a point of discharge of a melting furnace into the bottom of the chill mold, the depth of fill being the depth of the radioactive, molten glass in the chill mold, the method comprising:
causing an electrical current to flow continually through a first electrode in the melting furnace, through the jet stream of radioactive, molten glass and through a second electrode in the bottom of the chill mold;
measuring the distance of the bottom of the chill mold from the point of discharge;
continually measuring the electrical resistance of the jet stream of radioactive, molten glass to the flow of electrical current;
continually calculating the length of the jet stream of radioactive, molten glass as the chill mold fills and the jet stream shortens according to the relationship: $L = (R \times F)/P$, where L equals the length of the stream, R equals the measured electrical resistance, F equals a cross sectional area of the stream, and P equals the density of the liquid in the stream; and
continually calculating the depth of fill of radioactive, molten glass according to the relationship: $D = L_{max} L$, where D equals the depth of fill, $L_{max}$ equals the distance of the bottom of the chill mold from the point of discharge, and L equals the length of the stream.

3. Apparatus for the measurement of the depth of fill of an electrically conductive liquid flowing in a stream from a point of discharge of a first container into a second container, the depth of fill being the depth of the liquid in the second container, the apparatus comprising:
means for causing electricity to flow in the stream from the first container to the second container;
means for measuring an electrical characteristic of the electricity flowing in the stream;

means for calculating the depth of fill utilizing the electrical characteristic by calculating the length of the stream from the point of discharge to the fill, utilizing the electrical characteristic and calculating the depth of fill utilizing the calculated length of the stream;

in which the means for causing electricity to flow in the stream includes means for causing an electrical current to flow in the stream, and the means for measuring an electrical characteristic of the electricity includes means for measuring the electrical resistance of the electrical current in the stream;

in which the means for causing an electrical current to flow in the stream includes a pair of electrodes, one in electrical contact with the stream at the first container and the other in electrical contact with the stream at the second container, and an electrical circuit between the electrodes including a voltage source;

in which the means for measuring the electrical resistance of the electrical current in the stream includes an electrical resistance measuring instrument in the circuit;

in which the means for calculating the depth of fill utilizing the electrical characteristic includes an evaluator unit operatively connected to the electrical resistance measuring instrument, the evaluator unit including calculating means; and in which the calculator means includes means for calculating the length of the stream according to the relationship: $L=(R \times F)/P$, where L equals the length of the stream, R equals the measured electrical resistance, F equals a cross-sectional area of the stream, and P equals the density of the liquid in the stream.

4. Apparatus for continually measuring the depth of fill of radioactive, molten glass in a chill mold, the radioactive, molten glass flowing in a jet stream from a point of discharge of a melting furnace into the bottom of the chill mold, the depth of fill being the depth of the radioactive, molten glass in the chill mold, the apparatus comprising:

means for continually flowing an electrical current through the jet stream of radioactive, molten glass, the means including a first electrode in the melting furnace, a second electrode in the bottom of the chill mold, a voltage source and an electrical circuit among the electrodes, voltage source and jet stream;

the melting furnace and chill mold having a fixed distance from the point of discharge to the bottom of the chill mold;

means for continually measuring the electrical resistance of the jet stream of radioactive, molten glass to the flow of electrical current, the means including a continually-measuring measuring instrument in the electrical circuit;

means for (a) continually calculating the length of the jet stream of radioactive, molten glass as the chill mold fills and the jet stream shortens according to the relationship: $L=(R \times F)/P$, where L equals the length of the stream, R equals the measured electrical resistance, F equals a cross-sectional area of the stream, and P equals the density of the liquid in the stream, and (b) for continually calculating the depth of fill of radioactive, molten glass according to the relationship: $D=L_{max}-L$, where D equals the depth of fill, $L_{max}$ equals the distance of the bottom of the chill mold from the point of discharge, and L equals the length of the stream, the means comprising an evaluator unit operatively connected to the measuring instrument.

* * * * *